(12) United States Patent
Harper et al.

(10) Patent No.: US 7,859,417 B2
(45) Date of Patent: Dec. 28, 2010

(54) OBJECT TRACKING IN AN ENCLOSURE

(75) Inventors: Lawrence Edward Harper, Marietta, GA (US); Derry Thomas DeNise, Decatur, GA (US)

(73) Assignee: Winware, Inc., Marietta, GA (US)

( * ) Notice: Subject to any disclaimer, the term of this patent is extended or adjusted under 35 U.S.C. 154(b) by 356 days.

(21) Appl. No.: 12/051,061

(22) Filed: Mar. 19, 2008

(65) Prior Publication Data

US 2008/0165013 A1 Jul. 10, 2008

Related U.S. Application Data

(63) Continuation-in-part of application No. 11/622,816, filed on Jan. 12, 2007, now Pat. No. 7,753,272, which is a continuation-in-part of application No. 10/990,907, filed on Nov. 17, 2004, now Pat. No. 7,337,963.

(60) Provisional application No. 60/565,089, filed on Apr. 23, 2004.

(51) Int. Cl.
*G08B 1/00* (2006.01)

(52) U.S. Cl. .............. 340/572.8; 340/572.1; 340/545.6; 340/569; 340/570; 235/383; 235/385; 705/22; 705/28

(58) Field of Classification Search .............. 340/572.8, 340/572.1, 545.6, 568.1, 569, 570, 825.49, 340/825.69; 235/375, 376, 383, 385; 705/22, 705/28
See application file for complete search history.

(56) References Cited

U.S. PATENT DOCUMENTS 4,866,661 A 9/1989 de Prins 5,671,362 A 9/1997 Cowe et al.
5,693,134 A 12/1997 Stephens (Continued)

FOREIGN PATENT DOCUMENTS

DE 20011952 11/2001

(Continued)

OTHER PUBLICATIONS

U.S. Appl. No. 11/969,350, filed Jan. 4, 2008, entitled "Portal System for a Controlled Space", inventors Lawrence Edward Harper and Derry Thomas DeNise (Note: Copy not provided as PTO has copy on record).

(Continued)

*Primary Examiner*—Hung T. Nguyen
(74) *Attorney, Agent, or Firm*—Thomas, Kayden, Horstemeyer & Risley, LLP

(57) ABSTRACT

Various embodiments of object tracking systems and related methods and devices are disclosed. One enclosure for object tracking comprises an interior space that is designed to contain radio frequency identification (RFID) tag. The enclosure further includes top, bottom and side walls that form the interior space. The walls are designed to prevent very little or no radio frequency (RF) signals leakage outside of the enclosure. The side walls include a front wall that includes at least one slot to facilitate accessing the interior space. The enclosure further includes at least one access member that is designed to move in and out of the enclosure via the at least one slot. The access member includes extending members that are designed to cover the openings between the access member and slot, thus preventing very little or no RF signals leakage outside of the enclosure.

23 Claims, 3 Drawing Sheets

U.S. PATENT DOCUMENTS

| | | |
|---|---|---|
| 6,182,053 B1 | 1/2001 | Rauber et al. |
| 6,195,006 B1 | 2/2001 | Bowers et al. |
| 6,549,891 B1 | 4/2003 | Rauber et al. |
| 6,681,990 B2 | 1/2004 | Vogler et al. |
| 6,693,539 B2 | 2/2004 | Bowers et al. |
| 6,708,879 B2 | 3/2004 | Hunt |
| 6,935,560 B2 | 8/2005 | Andreasson et al. |
| 6,989,749 B2 * | 1/2006 | Mohr ............... 340/572.1 |
| 6,996,538 B2 | 2/2006 | Lucas |
| 7,120,278 B2 | 10/2006 | Sukegawa et al. |
| 7,140,542 B2 | 11/2006 | Andreasson et al. |
| 7,202,785 B2 | 4/2007 | Maloney |
| 7,337,963 B2 | 3/2008 | Harper et al. |
| 2001/0000019 A1 | 3/2001 | Bowers et al. |
| 2002/0118111 A1 | 8/2002 | Brown et al. |
| 2002/0145520 A1 * | 10/2002 | Maloney ............. 340/568.1 |
| 2002/0183882 A1 | 12/2002 | Dearing et al. |
| 2002/0198795 A1 | 12/2002 | Dorenbosch |
| 2003/0034390 A1 | 2/2003 | Linton et al. |
| 2003/0102970 A1 * | 6/2003 | Creel et al. ......... 340/568.1 |
| 2010/0079240 A1 * | 4/2010 | Higham ............... 340/5.54 |

OTHER PUBLICATIONS

U.S. Appl. No. 12/051,065, filed Mar. 19, 2008, entitled "Portal System for a Controlled Space", inventors Lawrence Edward Harper and Derry Thomas DeNise (Note: Copy not provided as PTO has copy on record).

\* cited by examiner

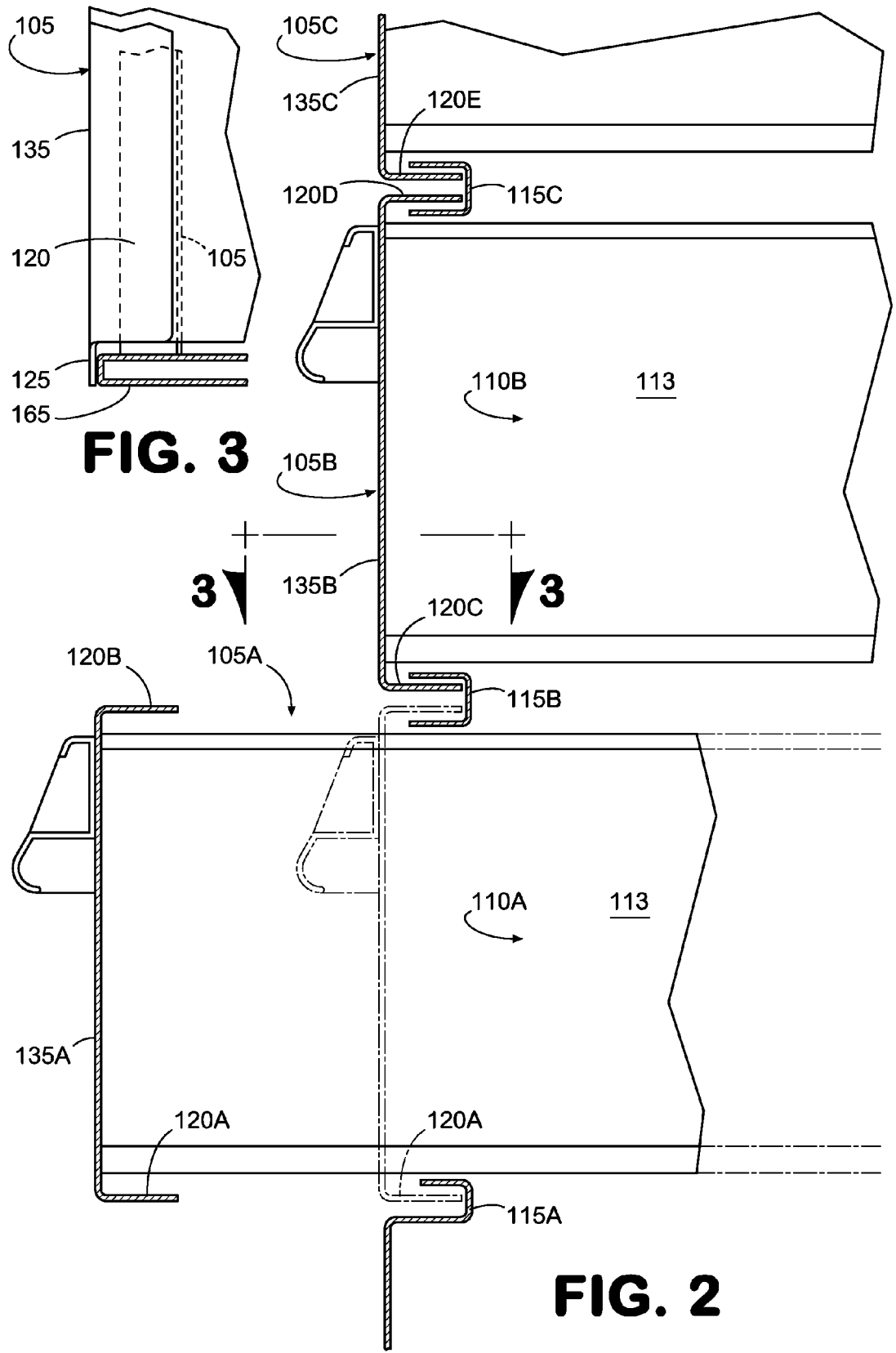

US 7,859,417 B2

OBJECT TRACKING IN AN ENCLOSURE

CROSS-REFERENCE TO RELATED APPLICATIONS

This application is a continuation-in-part of copending U.S. utility application entitled, "Object Tracking in an Enclosure," having Ser. No. 11/622,816, filed Jan. 12, 2007, which is a continuation-in-part of U.S. utility application entitled, "Portal System for Controlled Space," having Ser. No. 10/990,907, filed Nov. 17, 2004, now Pat. No. 7,337,963, which claims the benefit of U.S. provisional application having Ser. No. 60/565,089, filed Apr. 23, 2004, all of which are entirely incorporated herein by reference.

This application is related to U.S. utility patent application entitled "RFID Switching," having Ser. No. 11/622,827, filed Jan. 12, 2007, now Pat. No. 7,669,765, which is entirely incorporated herein by reference.

TECHNICAL FIELD

The present disclosure is generally related to monitoring and tracking objects, and more particularly, to an enclosure that prevents little or no RF signal leakage outside of the enclosure.

BACKGROUND OF THE DISCLOSURE

Companies typically have difficulties tracking inventory items or objects and their usage within their facilities. Many inventory items are misused, misplaced, and improperly tracked and replenished by the employees of the companies. In some industries, misplaced items can lead to serious mishaps. For instance, in the aerospace industry, a wrench or other tool left behind in the maintenance or construction of an aircraft engine can result in the catastrophic failure of an engine valued at hundreds of thousands of dollars, or even worse if undetected before operation.

Various safeguards have been established in the aerospace industry to prevent such mishaps, such as foreign object detection or FOD. FOD requires procedures that monitor the location of any object that can fall into (or otherwise be mistakenly left in) an aircraft or aircraft component. In a typical aerospace manufacturing environment, such procedures may result in one or more inspection personnel providing inspections of tool cabinets and tool drawers (herein, such tool cabinets and drawers collectively or individually referred to generally as enclosures).

Shadowboxing may also be implemented in accord with such procedures. Shadowboxing refers to an outline of indirect material (e.g., objects such as wrenches, gauges, safety glasses, tools, pencils, etc.) in or on surfaces located within enclosures. The outline (or shadowbox) may be further distinguished from the surrounding surfaces by possessing a different color, different material, and/or different topology (e.g., such as a recess in a particular material).

In some embodiments, other methods to provide distinction may be used (e.g., pegs or protrusions providing an outline of an object) alone or in combination with the aforementioned distinguishing features. When an object does not reside in the shadowbox, the outline provides an immediate visual indication to inspection personnel that the object is missing, and thus other procedures are invoked to track the missing object to prevent possible damage to equipment or harm to personnel. In a given manufacturing environment, the quantity of such enclosures that are to be checked one or more times throughout the day can consume a considerable amount of man-hours.

SUMMARY

The present disclosure provides various embodiments of systems and methods and related devices for object tracking in an enclosure. One enclosure for object tracking comprises an interior space that is designed to contain radio frequency identification (RFID) tag. The enclosure further includes top, bottom and side walls that form the interior space. The walls are designed to prevent very little or no radio frequency (RF) signals leakage outside of the enclosure. The side walls include a front wall that includes at least one slot to facilitate accessing the interior space. The enclosure further includes at least one access member that is designed to move in and out of the enclosure via the at least one slot. The access member includes extending members that are designed to cover the openings between the access member and slot, thus preventing very little or no RF signals leakage outside of the enclosure.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the disclosed systems, devices, and methods. Moreover, in the drawings, like reference numerals designate corresponding parts throughout the several views.

FIG. 2 is a cross-sectional view of the enclosure, such as that shown in FIG. 1, depicting first extending members of access members and grooves of the slots;

FIG. 3 is a cross-sectional top view of the enclosure, such as that shown in FIG. 1, that depicts a second extending member of the access member engaging a side wall of the enclosure.

DETAILED DESCRIPTION OF THE DISCLOSURE

Figure 1:
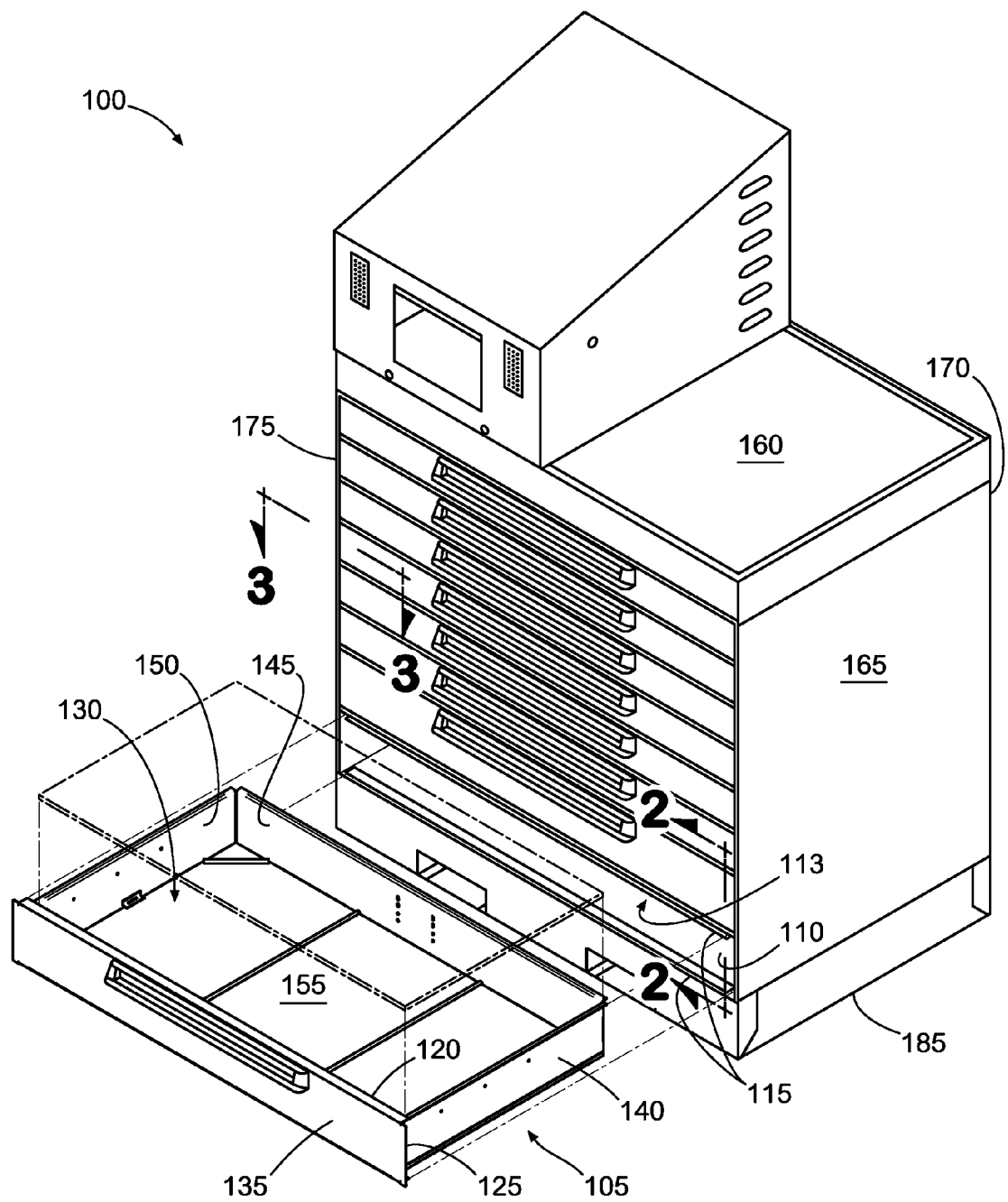
FIG. 1 is a schematic diagram that shows one embodiment of an enclosure that prevents little or no RF signal leakage outside of the enclosure.

Disclosed herein are various embodiments of an enclosure that prevents little or no RF signal leakage outside of the enclosure. The enclosure can be designed to operate with systems and devices that regulate access to objects in the enclosure. The systems and devices monitor the entry of objects into, and removal of objects from an enclosure using radio frequency identification (RFID) technology. Exemplary systems and devices are disclosed in U.S. utility application entitled, "Object Tracking in an Enclosure," having Ser. No. 11/622,816, filed Jan. 12, 2007, which is entirely incorporated herein by reference.

Certain embodiments of the object tracking systems disclosed in the '816 application comprise a computing system that provides authentication functionality, whereby access to one or more objects in an enclosure is permitted when a user seeking access is authenticated (e.g., confirmed that he or she is authorized to access the interior of the enclosure). For instance, in one embodiment, a user enters his or her identification information (e.g., by manual entry, through bar code or magnetic strip scanning, etc.) via an interface (e.g, touch-screen, graphical user interface (GUI), keypad entry interface, magnetic card reader, bar scanner, biometric scan, etc.).

The computing system, in one embodiment through comparison of the received identification information with authorized user information in a database or other data structure, determines if the user is authorized to access the interior of the enclosure. Upon successful authentication, access to the interior of the enclosure by the user is enabled.

With regard to object tracking functionality, each object stored in an enclosure is associated with a corresponding radio frequency identification (RFID) tag. In one embodiment, each object is associated with a switch, the switch having a tag affixed thereto. When the switch is loaded with the object, the tag possesses one state. When the object is removed from the enclosure, the tag possesses another state. Each state is treated differently by the computing system to enable the monitoring of when an object is removed and when an object is returned or otherwise inserted into the enclosure, as described below. In some embodiments, each RFID tag is attached to, or integrated into, each object in an enclosure. In some embodiments, a combination of these methods for associating RFID tags with objects may be used. The initial association of each RFID tag with a particular object can be implemented through a user interactive start-up or configuration procedure implemented at any point in time.

Detection and identification of an object occurs through an interaction of signal exchanges between RFID tags in an enclosure and the computing system. In one embodiment, an RFID tag stores an identifier on a microchip that is coupled to an antenna, the identifier associated (e.g., through the association process mentioned above) with an object in the enclosure.

The microchip and the antenna comprise what is often referred to as an RFID transponder or RFID tag. The RFID tag is responsive to an excitation signal from the computing system, the latter which includes one or more readers, with each reader having receiver/transmitter (or transceiver) functionality as described further below. That is, in response to being activated or awakened by the excitation signal from the computing system (e.g., the reader of the computing system), the RFID tag transmits a response signal comprising the identification information to the reader.

The reader converts the radio waves provided from the RFID tag into information that can be used to detect the presence or absence of an object associated with a particular RFID tag. The transmission of the identification information from the RFID tag may be implemented in some embodiments by generating an "original" signal (e.g., separate from and independent of the received excitation signal) in response to excitation by the signal from the reader.

In some embodiments, the transmission may be implemented by reflecting back a portion of the excitation signal from the reader in a process referred to as backscatter. In some embodiments, a combination of both processes may occur. In other words, the RFID tags included within the scope of this disclosure include active, passive, or semi-passive tags, and in some embodiments, a combination of one or more of these types of RFID tags may be used in a given enclosure.

Having described generally the underlying functionality and architecture of certain embodiments of an object tracking system, one object tracking method embodiment can generally be described as follows. The computing system continually emits excitation signals to the interior of the enclosure in an effort to track which objects currently reside within the enclosure. Such emission of excitation signals to the interior for reception by the RFID tags, the receiving and reading of the information corresponding to the response signals from the RFID tags, and the determination as to which tags have been removed or returned (hence which objects have been removed or returned) is also referred to herein as a scan, scanning, or a scanning process or the like.

When a user seeks to access the interior space of the enclosure (e.g., to return an object, or remove an object), the user enters identification information at an interface of the enclosure, which is received and processed by the computing system. If the user is not authorized to access the interior space of the enclosure, the user is denied access (e.g., the access member(s) removably blocking access to the interior of the enclosure remain locked).

If the user is authorized, the computing system disengages a locking mechanism coupled to the access member(s) of an entrance or access point of the enclosure to enable access to the interior space of the enclosure, and the computing system in one embodiment temporarily ceases the scanning process. In one embodiment, the temporary cessation of the scan process occurs responsive to authentication (before disengagement of the locking mechanism). In some embodiments, the temporary cessation of the scan process can occur responsive to the disengagement of the locking mechanism, the opening of an access member, or a combination of two or more of the above described mechanisms in a redundant fashion (e.g., if the scan process does not cease after authentication, the disengagement and/or the opening of the access member acts as a fails-safe mechanism to ensure the scanning process ceases).

Assume the user removes a tool. Such removal of the tool either removes the associated RFID tag (assuming coupling or integration of the RFID tag with or within the tool), or the removal of the tool changes the status or state of an RFID tag, for instance by closing of a metallic switch upon the RFID tag to disable the ability of the computing system to properly read the RFID tag. When the user closes the access member (e.g., cabinet door), a sensor senses that the access member is closed and communicates (e.g., by actively sending or via polling mechanisms implemented by the computing system) this change in access member status to the computing system, which responsively resumes the scan process.

In some embodiments, the re-engagement (automatic upon closure, or in some embodiments, controlled by the computing system responsive to receipt of status of door opening from the sensor) of the locking mechanism is sensed or otherwise communicated to the computing system, and the computing system resumes the scanning process responsive to re-engagement. Through the resumption of the scanning process, the computing system determines that an object listed in its corresponding database is not detected during the scanning process (e.g., either because the tag is physically removed from the enclosure or the tag status has changed to a non-readable state in a switch embodiment).

From the signals received from the RFID tags, the computing system (e.g., software in the computing system) updates the count of the objects associated with the enclosure and continually updates the accuracy of such a count. Additionally, the computing system provides feedback of that missing tool to a user, operator, or other device (e.g., networked computer used by a tool manager or quality assurance personnel responsible for monitoring tool inventory and/or compliance with safety protocols among one or more enclosures). Such feedback may be implemented via one or more of a local and/or remote screen display, warning lights, sound, among other mechanisms described below.

Having described various system and method embodiments, among others, disclosed in the '816 application, what follows is a description of yet another feature of the computing system during the scanning process. The computing system can report to an administrative user that objects are removed and returned from the enclosure. The report can be implemented via electronic document, such as in a spreadsheet.

If after the initial report and optionally the enclosure is locked and/or closed, the reader can be configured to detect an object that was previously detected to be removed from the enclosure. The system can report a mistake and update the count of the objects associated with the enclosure.

Having described the features of the computing system above, what follows is a description of an enclosure that is designed to prevent little or no RF signal leakage outside of the enclosure. Referring now to FIG. 1, shown is a schematic diagram that shows one embodiment of the enclosure 100 that is designed to contain the RFID tags and objects. The enclosure 100 comprises a top wall 160, side walls 165, 170, 175 and bottom wall 185 that form an interior space 113. The RFID tags and the objects are contained in the interior space 113 of the enclosure 100. The walls 160, 165, 170, 175, 185 are made of materials that prevents very little or no RF signals leakage outside of the enclosure. The materials include, but are not limited to, radiation absorbent materials, such as, iron ball paint or foam absorber, and radiation reflective materials, such as, metal.

The front of the enclosure 100 includes at least one slot 110 to facilitate accessing the interior space 113 of the enclosure 100. Each slot 110 is configured to engage an access member 105 that is designed to move in and out of the slot 110. The access member 105 includes a bottom wall 155 that is made of materials that enable the RF signals to pass through the bottom wall 155, resulting in the RF signals to be transmitted throughout the interior space 113 and received by an antenna (not shown) of a receiver (not shown) that is generally located in the enclosure. The materials include, but are not limited to, at least one of the following: compound wood, cardboard, plastic and plexiglass. The bottom wall 155 of the access member 105 is design to support the weight of the RFID tag and the object placed on the bottom wall 155.

The access member 105 further includes side walls 135, 140, 145, 150, which include a front wall 135 having materials that prevents very little or no RF signals leakage outside of the enclosure. The front wall 135 of the access member 105 is designed to be attached with first and second extending members 120, 125 along the peripheries of the access member 105. The first and second extending members 120, 125 are designed to cover the openings between the access member and the slot 110 and facilitate preventing little or no RF leakage outside of the enclosure 100.

The first extending member 120 is generally an elongated bar that substantially extends towards the interior space 113 and has a length that is generally measured from side wall 165 to side wall 175. The first extending members 120 generally attached to the top and bottom of the front wall 135 of the access member 105. The second 125 extending member 125 as shown in FIG. 1 extends from the front wall 135 towards the side walls 165, 175. The first and second extending members 120, 125 are further described in relation to FIGS. 2-3.

The slot 110 of the enclosure 100 includes grooves 115 along the top and bottom edge of the slot 110. In a closed position, the extending members 120 are designed to engage the grooves 115 to cover the openings between the access member 105 and the slot 110. The grooves 115 are also made of materials that prevent very little or no RF signals leakage outside of the enclosure. The groove 115 is generally an elongated U-shaped bar that substantially extends from side wall 165 to side wall 175. The grooves 115 are further described in relation to FIGS. 2-4.

FIG. 2 is a cross-sectional view of the enclosure, such as that shown in FIG. 1, depicting the first extending members 120 of the access members 105 and the grooves 115 of the slots 110. The enclosure 100 includes access members 105A, 105B that move in and out of slots 110A, 110B, respectively. The access members 105A, 105B include extending members 120A, 120B, 120C, 120D that extend towards the interior space 113 and engages grooves 115A, 115B, 115C, respectively, in the closed position.

In this embodiment, the access member 135A is the farthest access member 105A at the bottom of the enclosure 100. The groove 115A is designed to engage only one extending member 120A. The grooves 115B, 115C each is designed to engage two extending members 120B, 120C, 120D, 120E, respectively. The extending members 120B, 120C, 120D, 120E are adjacent to the top and bottom arms of the grooves 115B, 115C, respectively.

FIG. 3 is a cross-sectional top view of the enclosure 100, such as that shown in FIG. 1, that depicts the second extending member 125 engaging the side wall 165 of the enclosure 100. The front wall 135 of the access member 105 includes the second extending member 125 that extends towards and engages/overlaps the side wall 165, covering the opening between the access member 105 and the side wall 165. It should be appreciated that the extending member 125 generally has a height that is substantially the height of the front wall 135 of the access member 105.

Figure 4:
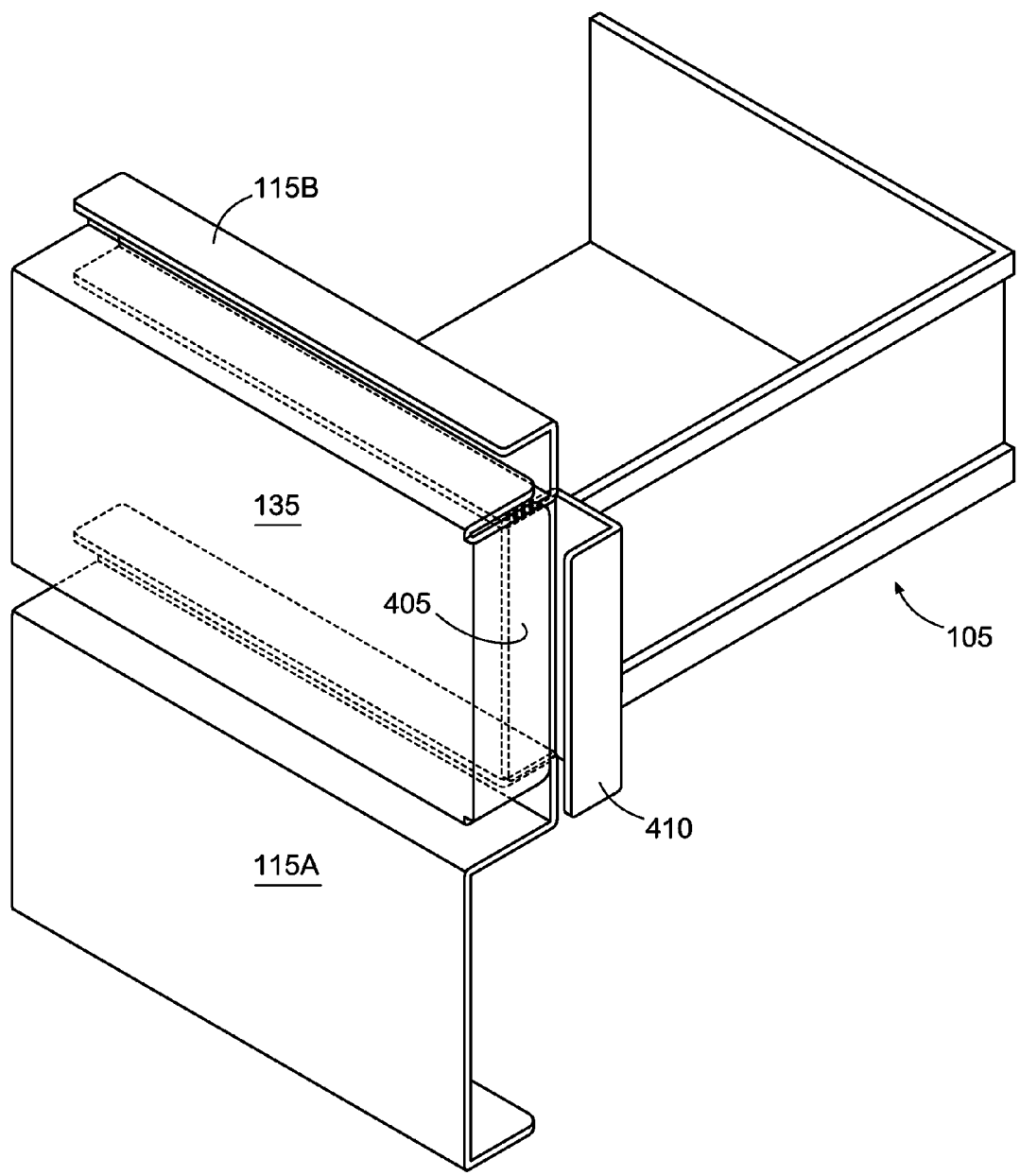
FIG. 4 is a schematic view of another embodiment of the access member, such as that shown in FIG. 1.

FIG. 4 is a schematic view of another embodiment of the access member 105, such as that shown in FIG. 1. The front wall 135 of the access member 105 can include third extending members 405 that are attached to the left and right sides of the front wall 135 and designed to extend towards the interior space 113 of the enclosure 100. The height of the third extending members 405 is substantially the height of the front wall 135. The third extending members 405 are designed to engage second elongated U-shape bars 410 that are attached to the left and right sides of the slot 110 along the side walls 165, 175, respectively.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosed systems and methods. All such modifications and variations are intended to be included herein within the scope of this disclosure and protected by the following claims.

The invention claimed is:

1. A system for object tracking in an enclosure, comprising:
   a radio frequency identification (RFID) tag that transmit radio frequency (RF) signals and;
   an enclosure that is designed to contain the RFID tag, the enclosure comprising: an interior space that is designed to contain the RFID tag;
   top, side and bottom walls that form an interior space, the walls being designed to prevent very little or no RF signals leakage outside of the enclosure, the side walls including a front wall that includes at least one slot to facilitate accessing the interior space; and at least one access member that is designed to move in and out of the enclosure via the at least one slot, the access member including at least one extending member that is designed to cover the openings between the access member and slot, thus preventing very little or no RF signals leakage outside of the enclosure.

2. The system of claim 1, wherein the at least one access member includes a front wall that is designed to be attached with the at least one extending member along the peripheries of the front wall.

3. The system of claim 1, wherein the at least one slot includes grooves along a portion of the edge of the slot, the at least one extending member including the at least one first extending member that is configured to extend from the peripheries of the front wall towards the interior space of the enclosure, the at least one first extending member being designed to engage the grooves to cover the openings between the access member and the slot, the grooves having materials that prevents very little or no RF signals leakage outside of the enclosure.

4. The system of claim 1, wherein the at least one extending member includes the at least one second extending member that is attached on the left and right sides of the front wall of the access member, the at least one second extending member being configured to extend towards the left and right side walls of the enclosure and designed to overlap the side wall of the enclosure and cover the openings between the access member and the slot.

5. The system of claim 1, wherein the at least one access member includes a bottom wall that is made of materials that enable RF signals to pass through the bottom wall, the materials including at least one of the following: compound wood, cardboard, plastic and plexiglass, the bottom wall of the access member being design to support the weight of the RFID tag placed on the bottom wall.

6. The system of claim 1, wherein the at least one extending member includes at least one third extending member that is attached to the left and right sides of the front wall of the access member and designed to extend towards the interior space of the enclosure, the grooves being attached along a portion of the left and right edge of the at least one slot, the at least one third extending member being configured to engage the grooves at the left and right edge of the at least one slot.

7. The system of claim 1, further comprising:
reader logic; and
transceiver control logic coupled to one or more antennas, wherein the processor is further configured with the reader logic and the transceiver control logic to implement a scan of the interior space, wherein the scan of the interior space comprises transmitting excitation signals to the RFID tag and other RFID tags, receiving response signals from the RFID tag and the other tags, and reading RFID tag identifying information corresponding to the response signals.

8. The system of claim 7, wherein the reader logic is configured to:
resume scanning of the interior space of the enclosure responsive to determining that the at least one access member is either closed or locked,
detect an object that was previously detected to be removed from the enclosure,
report the mistake to a user responsive to detecting that the object was previously detected to be removed from the enclosure, and
update the count of the objects associated with the enclosure.

9. An enclosure for object tracking, comprising:
an interior space that is designed to contain radio frequency identification (RFID) tag;
top, bottom and side walls that form an interior space, the walls being designed to prevent very little or no radio frequency (RF) signals leakage outside of the enclosure, the side walls include a front wall that includes at least one slot to facilitate accessing the interior space; and
at least one access member that is designed to move in and out of the enclosure via the at least one slot, the access member including at least one extending member that is designed to cover the openings between the access member and slot, thus preventing very little or no RF signals leakage outside of the enclosure.

10. The enclosure of claim 9, wherein the at least one access member includes a front wall that is designed to be attached with at least one extending member along the peripheries of the front wall.

11. The enclosure of claim 9, wherein the at least one slot includes grooves along a portion of the edge of the slot, the at least one extending member including at least one first extending member that is configured to extend from the peripheries of the front wall towards the interior space of the enclosure, the at least one first extending member being designed to engage the grooves to cover the openings between the access member and the slot, the grooves having materials that prevents very little or no RF signals leakage outside of the enclosure.

12. The enclosure of claim 9, wherein the at least one extending member includes at least one second extending member that is attached on the left and right sides of the front wall of the access member, the at least one second extending member being configured to extend towards the left and right side walls of the enclosure and designed to overlap the side wall of the enclosure and cover the openings between the access member and the slot.

13. The enclosure of claim 9, wherein the at least one access member includes a bottom wall that is made of materials that enable RF signals to pass through the bottom wall, the materials including at least one of the following: compound wood, cardboard, plastic and plexiglass, the bottom wall of the access member being design to support the weight of the RFID tag placed on the bottom wall.

14. The enclosure of claim 9, wherein the at least one extending member includes at least one third extending member that is attached to the left and right sides of the front wall of the access member and designed to extend towards the interior space of the enclosure, the grooves being attached along a portion of the left and right edge of the at least one slot, the at least one third extending member being configured to engage the grooves at the left and right edge of the at least one slot.

15. The enclosure of claim 9, further comprising:
reader logic; and
transceiver control logic coupled to one or more antennas, wherein the processor is further configured with the reader logic and the transceiver control logic to implement a scan of the interior space, wherein the scan of the interior space comprises transmitting excitation signals to the RFID tag and other RFID tags, receiving response signals from the RFID tag and the other tags, and reading RFID tag identifying information corresponding to the response signals.

16. The enclosure of claim 15, wherein the reader logic is configured to:

resume scanning of the interior space of the enclosure responsive to determining that the at least one access member is either closed or locked, detect an object that was previously detected to be removed from the enclosure, report the mistake to a user responsive to detecting that the object was previously detected to be removed from the enclosure, and update the count of the objects associated with the enclosure.

17. An enclosure for object tracking, comprising:

an interior space that is designed to contain radio frequency identification (RFID) tag;

top, bottom and side walls that form an interior space, the side walls including a front wall that includes at least one slot to facilitate accessing the interior space, the at least one slot including grooves along a portion of the edge of the slot, the walls and grooves being designed to prevent very little or no RF signals leakage outside of the enclosure; and at least one access member that is designed to move in and out of the enclosure via the at least one slot, the access member including at least one extending member that is designed to cover the openings between the access member and slot, thus preventing very little or no RF signals leakage outside of the enclosure, the at least one extending member including at least one first extending member that is designed to engage the grooves to cover the openings between the access member and the slot.

18. The enclosure of claim 17, wherein the at least one first extending member is configured to extend from the peripheries of the front wall towards the interior space of the enclosure.

19. The enclosure of claim 17, wherein the at least one extending member includes at least one second extending member that is attached on the left and right sides of the front wall of the access member, the at least one second extending member being configured to extend towards the left and right side walls of the enclosure and designed to overlap the side wall of the enclosure and cover the openings between the access member and the slot.

20. The enclosure of claim 17, wherein the at least one access member includes a bottom wall that is made of materials that enable RF signals to pass through the bottom wall, the materials including at least one of the following: compound wood, cardboard, plastic and plexiglass, the bottom wall of the access member being design to support the weight of the RFID tag placed on the bottom wall.

21. The enclosure of claim 17, wherein the at least one extending member includes at least one third extending member that is attached to the left and right sides of the front wall of the access member and designed to extend towards the interior space of the enclosure, the grooves being attached along a portion of the left and right edge of the at least one slot, the at least one third extending member being configured to engage the grooves at the left and right edge of the at least one slot.

22. The enclosure of claim 17, further comprising:

reader logic; and transceiver control logic coupled to one or more antennas, wherein the processor is further configured with the reader logic and the transceiver control logic to implement a scan of the interior space, wherein the scan of the interior space comprises transmitting excitation signals to the RFID tag and other RFID tags, receiving response signals from the RFID tag and the other tags, and reading RFID tag identifying information corresponding to the response signals.

23. The enclosure of claim 22, wherein the reader logic is configured to:

resume scanning of the interior space of the enclosure responsive to determining that the at least one access member is either closed or locked, detect an object that was previously detected to be removed from the enclosure, report the mistake to a user responsive to detecting that the object was previously detected to be removed from the enclosure, and update the count of the objects associated with the enclosure.

* * * * *